(12) United States Patent
Nakanishi et al.

(10) Patent No.: US 8,223,323 B2
(45) Date of Patent: Jul. 17, 2012

(54) CUTOFF WAVELENGTH MEASURING METHOD AND OPTICAL COMMUNICATION SYSTEM

(75) Inventors: Tetsuya Nakanishi, Yokohama (JP); Masaaki Hirano, Yokohama (JP); Takashi Sasaki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 310 days.

(21) Appl. No.: 12/750,029

(22) Filed: Mar. 30, 2010

(65) Prior Publication Data
US 2010/0247093 A1 Sep. 30, 2010

(30) Foreign Application Priority Data
May 13, 2009 (JP) ................................ 2009-116542

(51) Int. Cl.
*G01N 21/00* (2006.01)

(52) U.S. Cl. ...................................................... 356/73.1

(58) Field of Classification Search ................. 356/73.1; 398/143
See application file for complete search history.

(56) References Cited

U.S. PATENT DOCUMENTS

| | | | | |
|---|---|---|---|---|
| 4,636,070 A | * | 1/1987 | Ide | 356/73.1 |
| 4,767,207 A | * | 8/1988 | Takiguchi | 356/73.1 |

OTHER PUBLICATIONS

Ikeda, M., et al., "Low Bending Loss Optical Fiber with Reduced Splice Loss", 2003, pp. 6-10, No. 105.
CEI IEC 60793-1-44 (JIS C 6825), 2001.

* cited by examiner

*Primary Examiner* — Tarifur Chowdhury
*Assistant Examiner* — Tara S Pajoohi
(74) *Attorney, Agent, or Firm* — McDermott Will & Emery LLP

(57) ABSTRACT

A method includes a first step of joining a multimode fiber to a first end of an optical fiber being a specimen, allowing light to propagate from the multimode fiber to the specimen, measuring an intensity of light from a second end of the specimen, and determining a first power spectrum; a second step of joining the multimode fiber to a first end of a reference fiber having bending loss higher than that of the specimen, allowing light to propagate from the multimode fiber to the reference fiber, measuring an intensity of light from a second end of the reference fiber, and determining a second power spectrum; a third step of determining a difference spectrum by subtracting the second power spectrum from the first power spectrum; and a fourth step of determining a higher-order mode cutoff wavelength of the specimen on the basis of a shape of the difference spectrum.

6 Claims, 11 Drawing Sheets

CUTOFF WAVELENGTH MEASURING METHOD AND OPTICAL COMMUNICATION SYSTEM

BACKGROUND OF THE INVENTION

1. Field of the Invention

The present invention relates to a method for measuring a higher-order mode cutoff wavelength of an optical fiber and to an optical communication system using the method.

2. Description of the Related Art

It is important that an optical fiber used as an optical transmission path in an optical communication system have a single mode at a signal light wavelength (or a higher-order mode cutoff wavelength is shorter than a signal light wavelength). As methods for measuring a higher-order mode cutoff wavelength of an optical fiber, IEC 60793-1-44 (JIS C 6825) describes the bend reference technique (60793-1-44© IEC: 2001 p. 27) and the multimode reference technique (60793-1-44© IEC: 2001 p. 27). However, with the bend reference technique or the multimode reference technique, it may be difficult to measure cutoff wavelengths of the following optical fibers:

an optical fiber having low bending loss in higher-order modes (see Fujikura Giho, No. 105, pp. 6-10 (2003) M. Ikeda, et al.);

an optical fiber having a plurality of higher-order mode cutoff wavelengths close to each other; and an optical fiber having a cutoff wavelength close to an OH induced loss wavelength.

SUMMARY OF THE INVENTION

An object of the present invention is to provide a method for easily measuring a higher-order mode cutoff wavelength of an optical fiber for which it is difficult to measure its cutoff wavelength with the bend reference technique or the multimode reference technique.

To achieve the object described above, a method for measuring a higher-order mode cutoff wavelength of an optical fiber will be provided. The method according to an aspect of the present invention includes (1) a first step of joining a multimode fiber to a first end of an optical fiber (specimen) under test whose higher-order mode cutoff wavelength is to be measured, allowing light to propagate from the multimode fiber to the specimen, measuring an intensity of light exiting from a second end of the specimen after propagating through the specimen, and determining a first power spectrum on the basis of the measured intensity of light; (2) a second step of joining the multimode fiber to a first end of a reference fiber having bending loss higher than that of the specimen in a predetermined wavelength range, allowing light to propagate from the multimode fiber to the reference fiber, measuring an intensity of light exiting from a second end of the reference fiber after propagating through the reference fiber, and determining a second power spectrum on the basis of the measured intensity of light; (3) a third step of determining a difference spectrum by subtracting the second power spectrum from the first power spectrum; and (4) a fourth step of determining a higher-order mode cutoff wavelength of the specimen on the basis of a shape of the difference spectrum.

The predetermined wavelength range described above is a range including a wavelength which is expected to be a cutoff wavelength of the specimen and having a span over 200 nm. The span preferably be over 300 nm and may be not more than 800 nm. For example, the predetermined wavelength range described above is a wavelength range where the first power spectrum or the second power spectrum is determined.

In the method described above, the fourth step may include (4-1) a first sub-step of determining a specific range where a difference from a minimum value of the difference spectrum is less than 0.1 dB and a derivative of the difference spectrum is substantially 0; (4-2) a second sub-step of determining an average value of the difference spectrum in the specific range; and (4-3) a third sub-step of drawing, in a graph showing the difference spectrum, a straight line representing a value that is 0.1 dB larger than the average value, determining a wavelength at an intersection point of the difference spectrum and the straight line, and determining the wavelength at the intersection point as the higher-order mode cutoff wavelength of the specimen when values of the difference spectrum on a shorter wavelength side where wavelengths are shorter than the wavelength at the intersection point are larger than values of the difference spectrum on a longer wavelength side where wavelengths are longer than the wavelength at the intersection point.

In the second step, it is preferable that a length, a bending diameter, or the number of turns of the reference fiber be set such that the first power spectrum is larger than the second power spectrum on a longer wavelength side where wavelengths are longer than a cutoff wavelength of the reference fiber. In the predetermined wavelength range, a difference in mode field diameter between the specimen and the reference fiber is preferably 0.5 µm or less. In the first step, it is preferable to determine the first power spectrum of the specimen placed under a condition of actual system.

An optical communication system according to another aspect of the present invention includes, as an optical transmission path, an optical fiber under test whose higher-order mode cutoff wavelength is measured using the method described above. In the optical communication system, signal light having a wavelength longer than the measured cutoff wavelength is transmitted through the optical fiber under test.

The present invention makes it possible to easily measure a higher-order mode cutoff wavelength of an optical fiber for which it is difficult to measure its cutoff wavelength with the bend reference technique or the multimode reference technique.

DESCRIPTION OF THE PREFERRED EMBODIMENTS

Figure 1A:
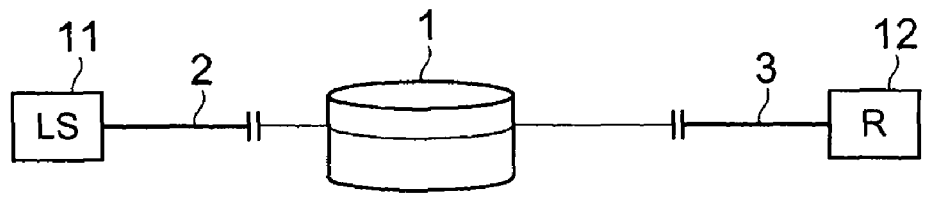
FIGS. 1A to 1D are conceptual diagrams illustrating a cutoff wavelength measuring method using the bend reference technique.

The above-mentioned features and other features, aspects, and advantages of the present invention will be better understood through the following description, appended claims, and accompanying drawings. In the explanation of the drawings, an identical mark is applied to identical elements and an overlapping explanation will be omitted.

FIGS. 1A to 1D are conceptual diagrams illustrating a cutoff wavelength measuring method using the bend reference technique. In the bend reference technique, a multimode fiber 2 is butt-joined to a first end of an optical fiber (specimen) under test 1 whose higher-order mode cutoff wavelength λc is to be measured, while a multimode fiber 3 is butt-joined to a second end of the specimen 1 (see FIG. 1A). Light output from a light source 11 is allowed to propagate through the multimode fiber 2, the specimen 1, and the multimode fiber 3 in this order. The intensity of light exiting from the multimode fiber 3 is measured by a detector assembly 12. Then, a first power spectrum S1 is determined on the basis of the measured intensity of light.

Figure 1B:
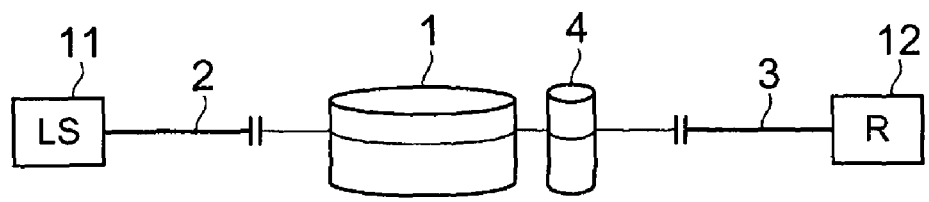

Next, the exit end of the specimen 1 is wound to form a smaller diameter bend 4, which blocks higher-order mode light from passing therethrough in a measurement wavelength range (see FIG. 1B). Light output from the light source 11 is allowed to propagate through the multimode fiber 2, the specimen 1, the smaller diameter bend 4, and the multimode fiber 3 in this order. The intensity of light exiting from the multimode fiber 3 is measured by the detector assembly 12. Then, a second power spectrum S2 is determined on the basis of the measured intensity of light.

To simulate typical usage of the specimen 1, the specimen 1 is set to 2 m in length and wound with a diameter of 280 mm. To applying additional bending loss to higher-order mode light by passing through the smaller diameter bend 4 in the measurement wavelength range, the exit end of the specimen 1 is wound with a small diameter of 60 mm or less.

Figure 1C:
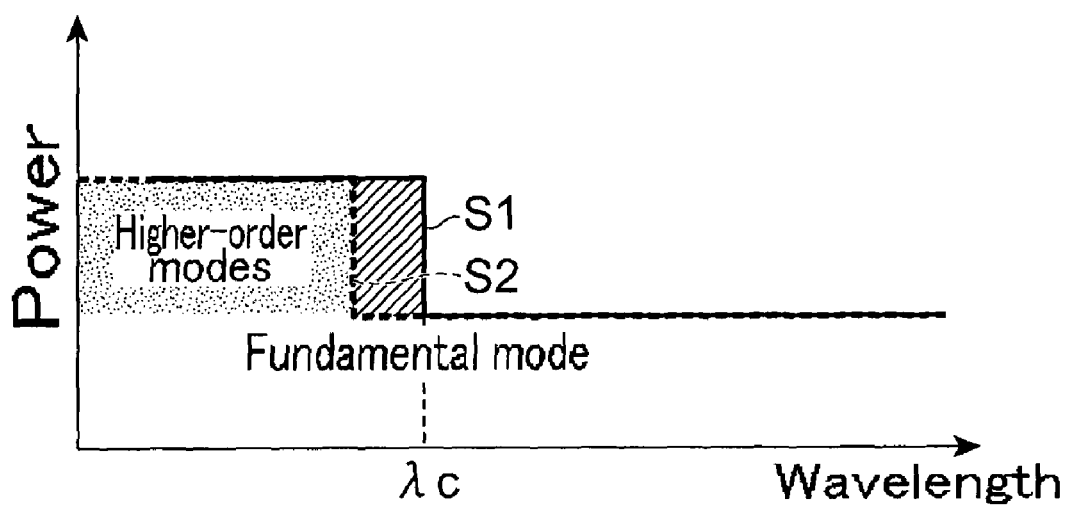
Figure 1D:
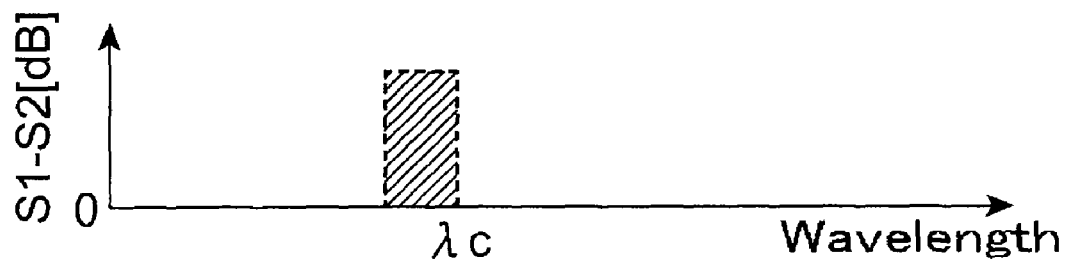

As shown in FIG. 1C, the first power spectrum S1 has large power on a shorter wavelength side where wavelengths are shorter than the cutoff wavelength λc of the specimen 1 since the first power spectrum S1 contains higher-order modes as well as a fundamental mode on the shorter wavelength side, while the first power spectrum S1 has small power on a longer wavelength side where wavelengths are longer than the cutoff wavelength λc of the specimen 1 since the first power spectrum S1 contains only the fundamental mode on the longer wavelength side. On the other hand, the second power spectrum S2 has small power even on the shorter wavelength side since power of the higher order mode attenuated by additional bend. Thus, when a difference spectrum is obtained by subtracting the second power spectrum S2 from the first power spectrum S1, it is possible to determine the cutoff wavelength λc of the specimen 1 on the basis of the shape of the difference spectrum (see FIG. 1D).

FIGS. 2A to 2D are conceptual diagrams illustrating a cutoff wavelength measuring method using the multimode reference technique. In the multimode reference technique, the optical fiber under test (specimen) 1, the multimode fiber 2, and the multimode fiber 3 are arranged in the same manner as that in the bend reference technique (see FIG. 2A). Again, to simulate typical usage of the specimen 1, the specimen 1 is set to 2 m in length and wound with a diameter of 280 mm. Light output from the light source 11 is allowed to propagate through the multimode fiber 2, the specimen 1, and the multimode fiber 3 in this order. The intensity of light exiting from the multimode fiber 3 is measured by the detector assembly 12. Then, a first power spectrum S1 is determined on the basis of the measured intensity of light.

Figure 2A:
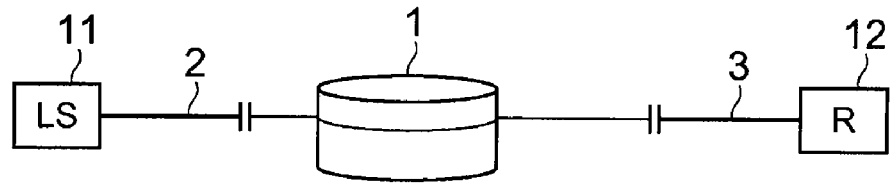
FIGS. 2A to 2D are conceptual diagrams illustrating a cutoff wavelength measuring method using the multimode reference technique.
Figure 2B:
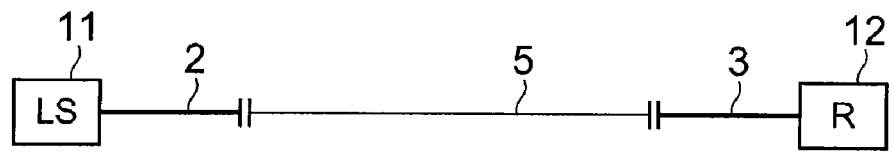

Next, in place of the specimen 1, a multimode fiber 5 is inserted between the multimode fiber 2 and the multimode fiber 3 (see FIG. 2B). Light output from the light source 11 is allowed to propagate through the multimode fiber 2, the multimode fiber 5, and the multimode fiber 3 in this order. The intensity of light exiting from the multimode fiber 3 is measured by the detector assembly 12. Then, a second power spectrum S2 is determined on the basis of the measured intensity of light.

Figure 2C:
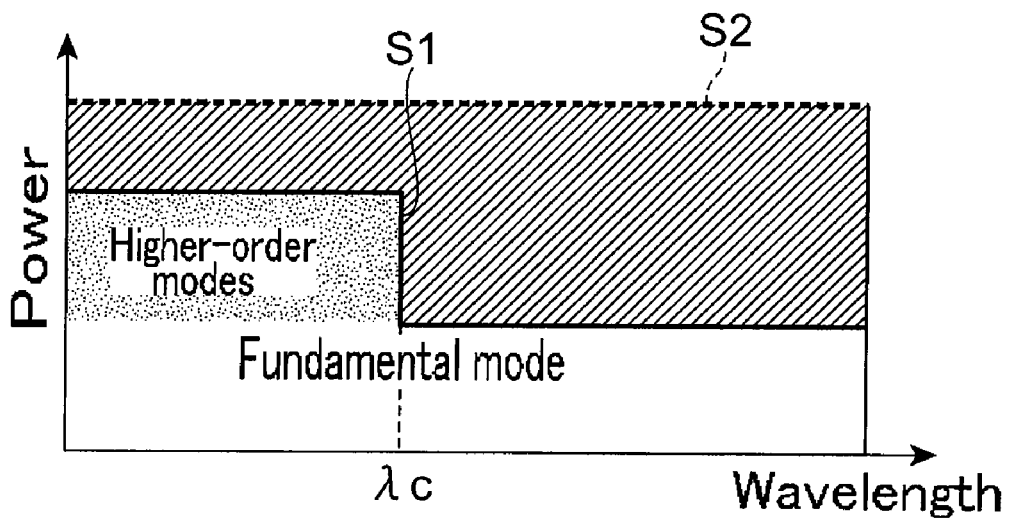
Figure 2D:
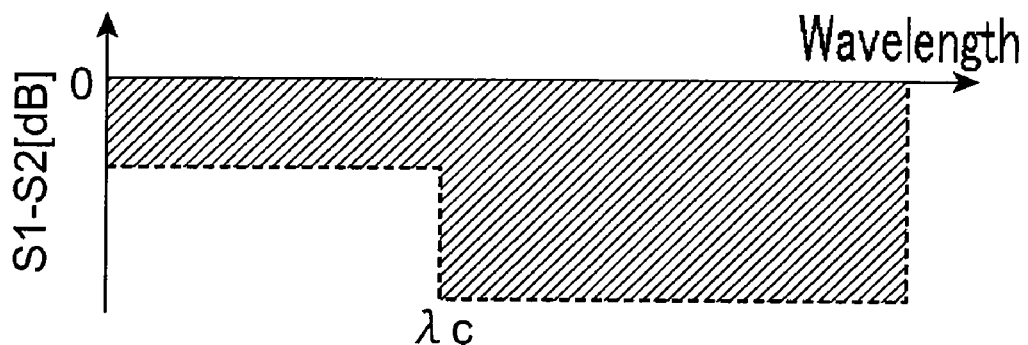

As shown in FIG. 2C, the first power spectrum S1 has large power on a shorter wavelength side where wavelengths are shorter than the cutoff wavelength λc of the specimen 1 since the first power spectrum S1 contains higher-order modes as well as a fundamental mode on the shorter wavelength side, while the first power spectrum S1 has small power on a longer wavelength side where wavelengths are longer than the cutoff wavelength λc of the specimen 1 since the first power spectrum S1 contains only the fundamental mode on the longer wavelength side. On the other hand, the second power spectrum S2 has large power as it contains the higher-order modes as well as the fundamental mode. Thus, in the multimode reference technique, when a difference spectrum is obtained by subtracting the second power spectrum S2 from the first power spectrum S1, it is possible to determine the cutoff wavelength λc of the specimen 1 on the basis of the shape of the difference spectrum (see FIG. 2D).

FIGS. 3A to 3D are conceptual diagrams illustrating a cutoff wavelength measuring method according to an embodiment of the present invention. In the cutoff wavelength measuring method according to the embodiment of the present invention, in a first step, the multimode fiber 2 is butt-joined to the first end of the optical fiber under test (specimen) 1, while the multimode fiber 3 is butt joined to the second end of the specimen 1 (see FIG. 3A). Light output from the light source 11 is allowed to propagate through the multimode fiber 2, the specimen 1, and the multimode fiber 3 in this order. The intensity of light exiting from the multimode fiber 3 is measured by the detector assembly 12. Then, a first power spectrum S1 is determined on the basis of the measured intensity of light.

In a second step, the specimen 1 is replaced with a reference fiber 6. The multimode fiber 2 is butt-joined to a first end of the reference fiber 6, while the multimode fiber 3 is butt-joined to a second end of the reference fiber 6 (see FIG. 3B). Light output from a light source 11 is allowed to propagate through the multimode fiber 2, the reference fiber 6, and the multimode fiber 3 in this order. The intensity of light exiting from the multimode fiber 3 is measured by the detector assembly 12. Then, a second power spectrum S2 is determined on the basis of the measured intensity of light.

In the cutoff wavelength measuring method according to the embodiment of the present invention, it is preferable again to simulate typical usage of the specimen 1. The specimen 1 may be set to 2 m in length and wound with a diameter of 280 mm. To determine the first power spectrum S1, the specimen 1 may be placed in a use environment of an optical transmission path etc. or under conditions equivalent to the use environment.

The reference fiber 6 has bending loss higher than that of the specimen 1 in a predetermined wavelength range, and has a cutoff wavelength shorter than the cutoff wavelength λc of the specimen 1. It is preferable to set the length, the bending diameter, or the number of turns of the reference fiber 6 such that the first power spectrum S1 is larger than the second power spectrum S2 on a longer wavelength side where wavelengths are longer than the cutoff wavelength of the reference fiber 6. It is also preferable, in the predetermined wavelength range, that a difference in mode field diameter between the specimen 1 and the reference fiber 6 be 0.5 μm or less.

The reference fiber 6 is preferably a low-OH loss fiber compliant with the ITU-T G.652.D standard. The reference fiber 6 may be of any length, but can preferably be elongated within a range where the transmission loss does not exceed 0.01 dB. For example, the reference fiber 6 is preferably 2 m to 10 m in length. The reference fiber 6 may be wound around a mandrel within a range where the bending loss at the cutoff wavelength λc of the specimen 1 does not exceed 0.01 dB. For example, the reference fiber 6 is preferably wound around a 60-mm diameter mandrel. Thus, it is possible to shorten the cutoff wavelength of the reference fiber 6 and extend the range of measurement.

Figure 3A:
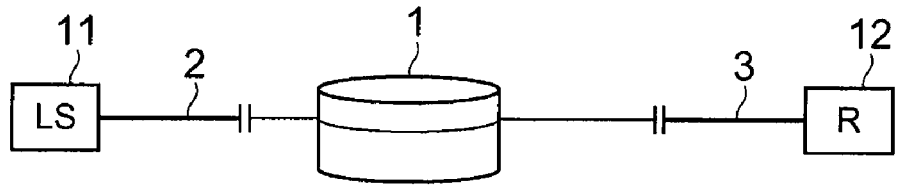
FIGS. 3A to 3D are conceptual diagrams illustrating a cutoff wavelength measuring method according to an embodiment of the present invention.
Figure 3B:
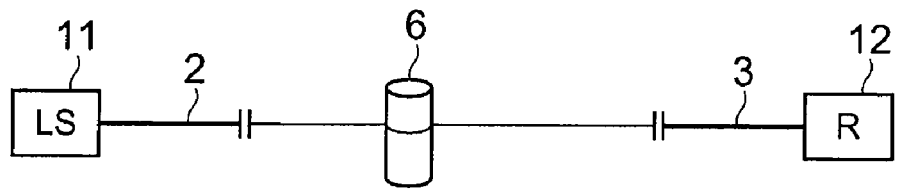
Figure 3C:
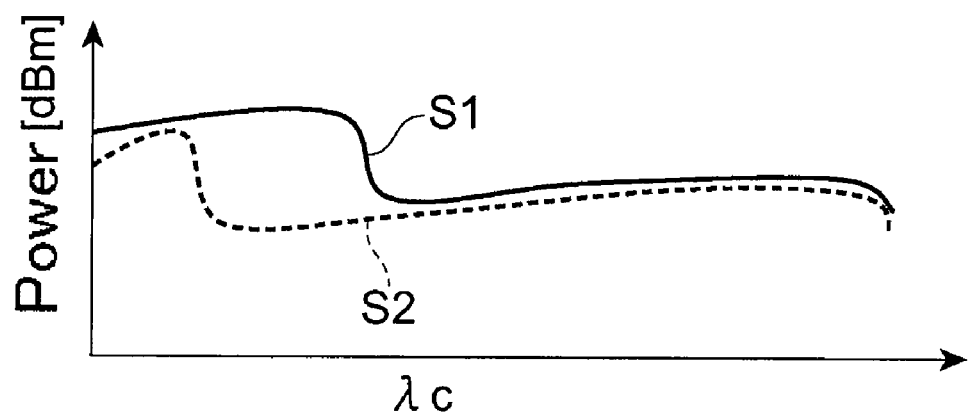

As shown in FIG. 3C, the first power spectrum S1 has large power on a shorter wavelength side where wavelengths are shorter than the cutoff wavelength λc of the specimen 1 since the first power spectrum S1 contains higher-order modes as well as a fundamental mode on the shorter wavelength side, while the first power spectrum S1 has small power on a longer wavelength side where wavelengths are longer than the cutoff wavelength λc of the specimen 1 since the first power spectrum S1 contains only the fundamental mode on the longer wavelength side. The second power spectrum S2 has large power on a shorter wavelength side where wavelengths are shorter than the cutoff wavelength of the reference fiber 6, the cutoff wavelength being shorter than the cutoff wavelength λc of the specimen 1, since the second power spectrum S2 contains higher-order modes as well as the fundamental mode on the shorter wavelength side. In contrast, the second power spectrum S2 has small power on a longer wavelength side where wavelengths are longer than the cutoff wavelength of the reference fiber 6 since the second power spectrum S2 contains only the fundamental mode on the longer wavelength side.

Figure 3D:
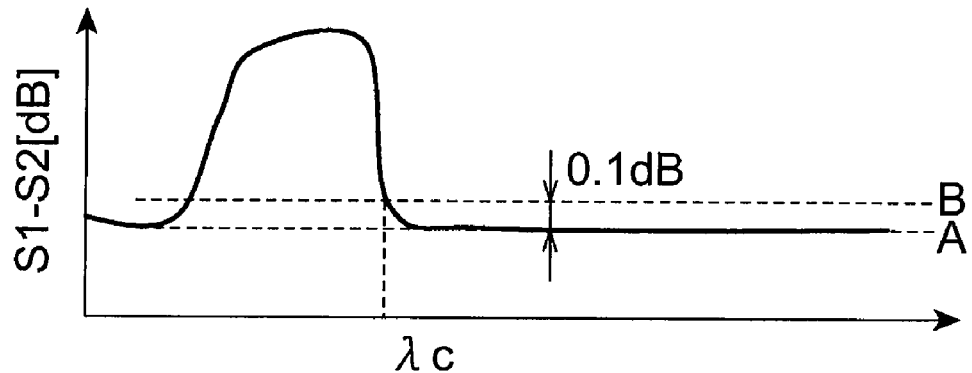

Thus, as shown in FIG. 3D, in a third step, a difference spectrum is determined by subtracting the second power spectrum S2 from the first power spectrum S1. Then, in a fourth step, the higher-order mode cutoff wavelength λc of the specimen 1 is determined on the basis of the shape of the difference spectrum. By performing first to third sub-steps (described below) of the fourth step, it is possible to more accurately determine the cutoff wavelength.

Figure 4A:
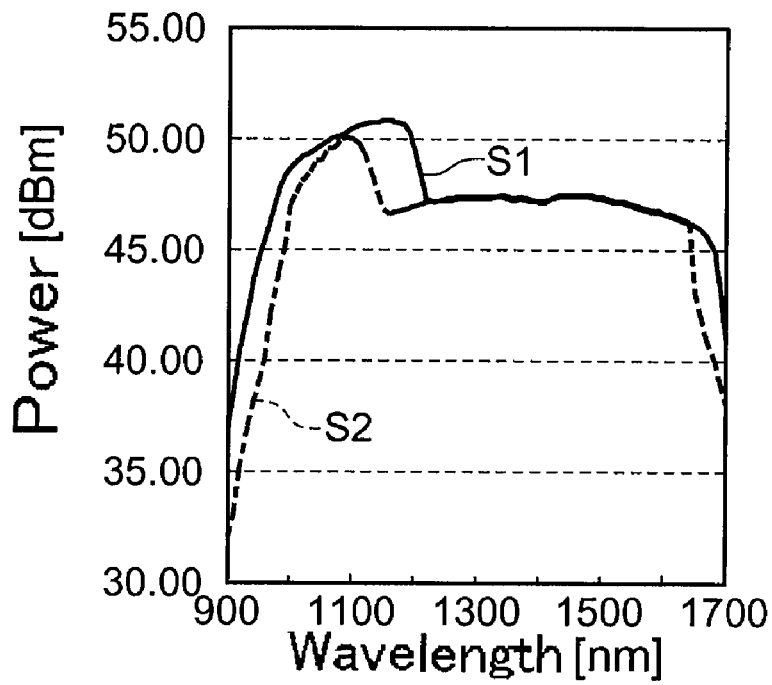
FIGS. 4A to 4C are graphs for explaining details of the cutoff wavelength measuring method according to the embodiment of the present invention.
Figure 4B:
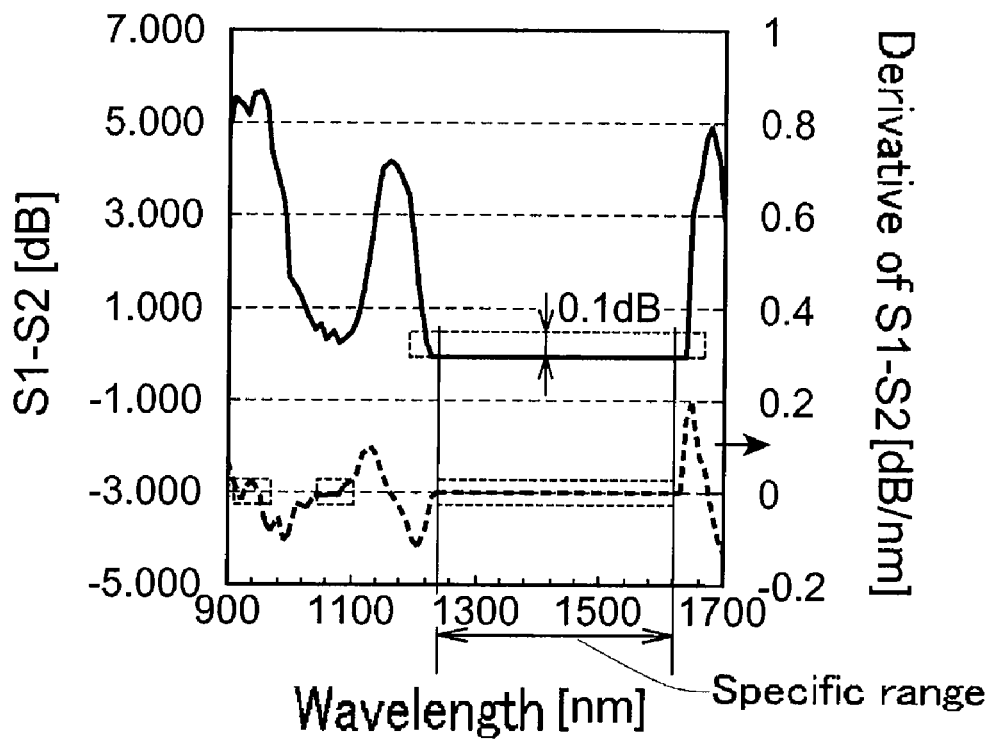
Figure 4C:
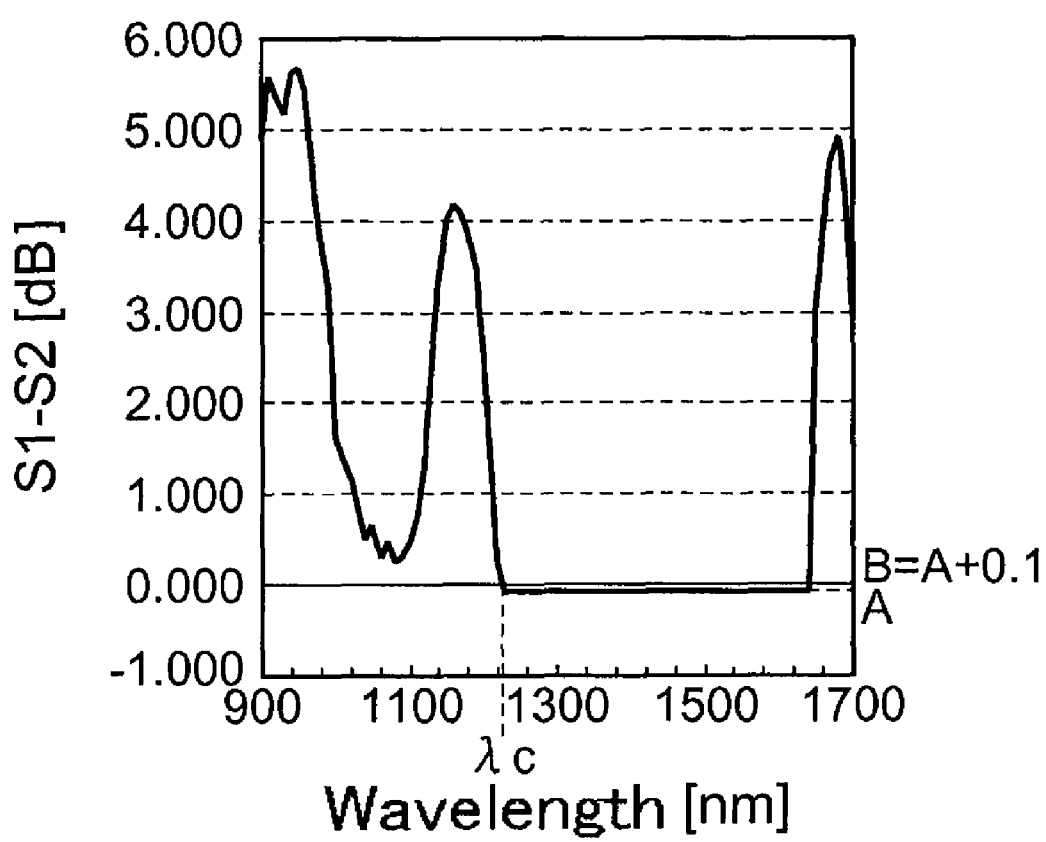

FIGS. 4A to 4C are graphs for explaining details of the cutoff wavelength measuring method according to the embodiment of the present invention. FIG. 4A shows the first power spectrum S1 obtained in the first step and the second power spectrum S2 obtained in the second step. In the third step, as shown in FIG. 4B, a difference spectrum (indicated by a solid line) is determined by subtracting the second power spectrum S2 from the first power spectrum S1. Then, in the first sub-step of the fourth step, a specific range where a difference from a minimum value of the difference spectrum is less than 0.1 dB and a derivative (indicated by a dotted line) of the difference spectrum (S1−S2) is substantially 0 is determined.

Next, as shown in FIG. 4C, in the second sub-step of the fourth step, an average value A of the difference spectrum in the specific range is determined. Then, in the third sub-step of the fourth step, in a graph showing the difference spectrum, a straight line representing a value B that is 0.1 dB larger than the average value A is drawn, and a wavelength at an intersection point of the difference spectrum and the straight line is determined. When values of the difference spectrum on a shorter wavelength side where wavelengths are shorter than the wavelength at the intersection point are larger than values of the difference spectrum on a longer wavelength side where wavelengths are longer than the wavelength at the intersection point, the wavelength at the intersection point is determined as the higher-order mode cutoff wavelength λc of the specimen 1.

Figure 5:
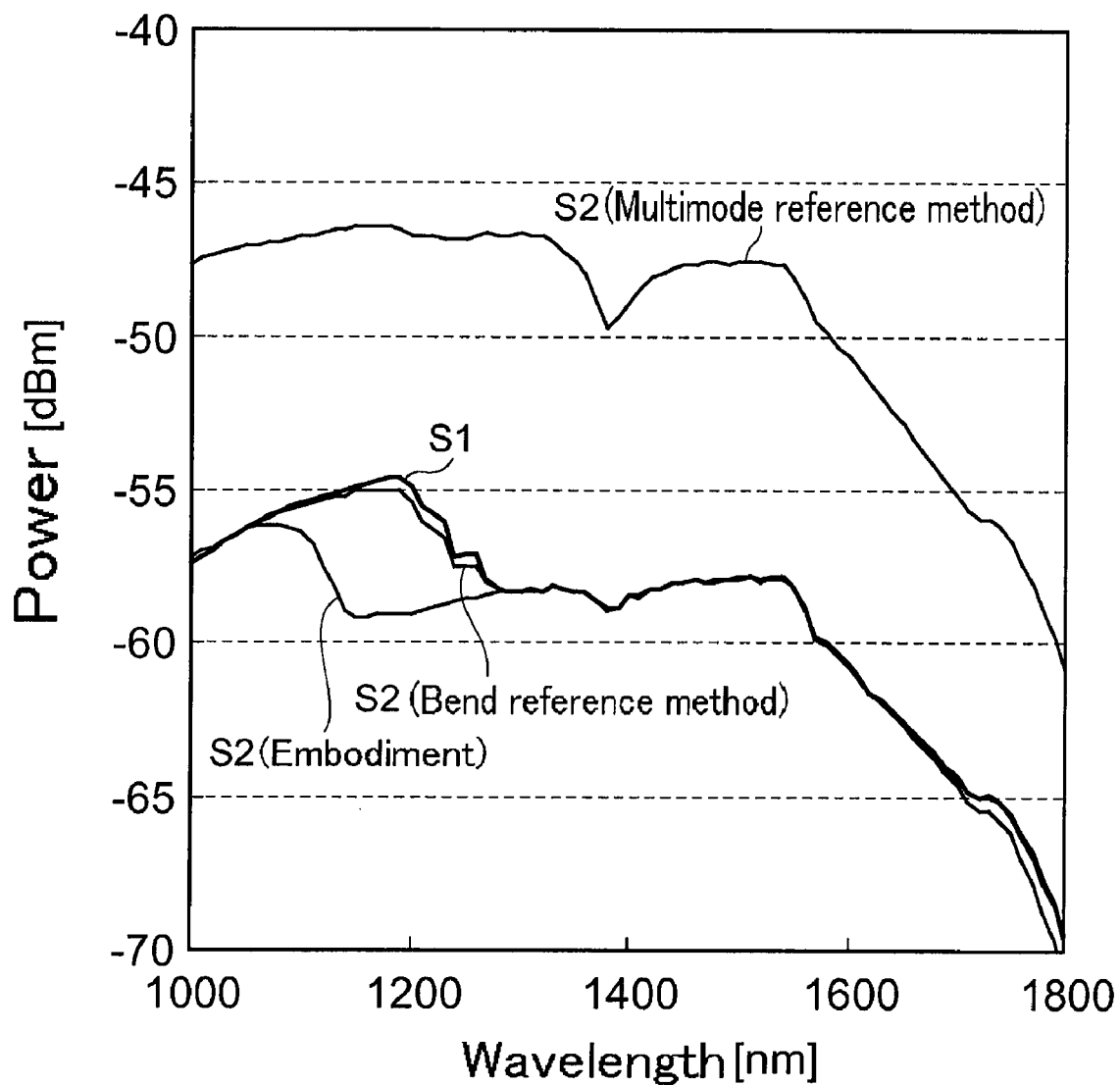
FIG. 5 is a graph showing a first power spectrum S1 and a second power spectrum S2 that corresponds to each of three measuring methods.
Figure 6:
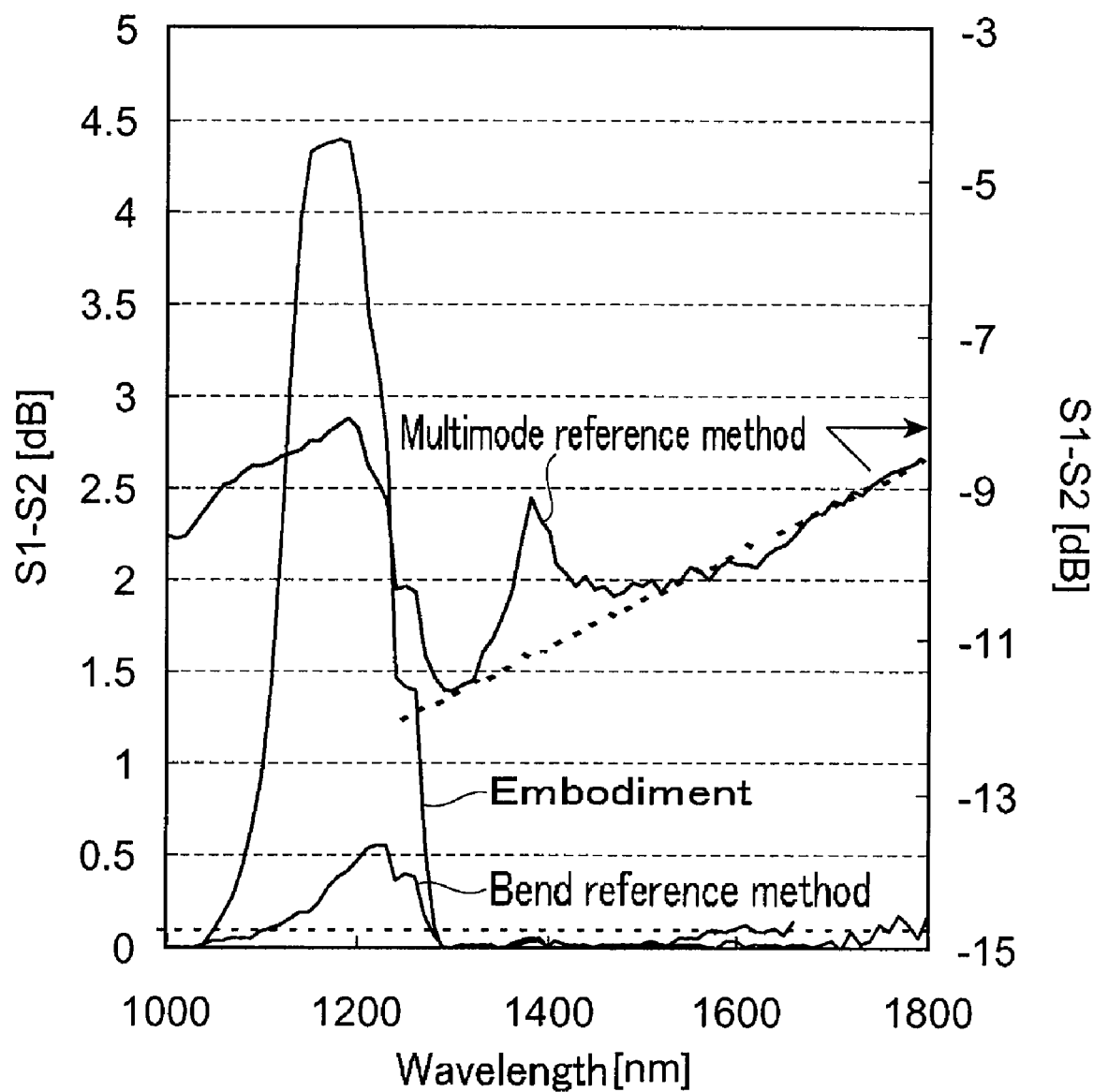
FIG. 6 is a graph showing a difference spectrum (S1−S2) determined by each of the three measuring methods.

FIGS. 5 and 6 are graphs each comparing results of measurements performed by the three measuring methods, that is, the bend reference technique, the multimode reference technique, and the method according to the embodiment of the present invention. FIG. 5 is a graph showing the first power spectrum S1 and the second power spectra S2. FIG. 6 is a graph showing the corresponding difference spectra (S1−S2). Here, the cutoff wavelength λc of the common specimen 1 was measured by each of the three measuring methods. Table shows the cutoff wavelength λc of the specimen 1, the cutoff wavelength λc being measured by each of the three measuring methods.

TABLE

| Measuring method | Determined wavelength nm |
| --- | --- |
| Bend reference technique | 1277 |
| Multimode reference technique | 1290 |
| Embodiment | 1281 |

The measured cutoff wavelengths λc obtained by the three measuring methods well agree with each other.

FIGS. 7A, 7B, 8A, 8B, 9A, 9B, 10A, and 10B are graphs for comparing examples of the cutoff wavelengths λc measured by the three measuring methods, that is, the bend reference technique, the multimode reference technique, and the method according to the embodiment of the present invention. Here, the cutoff wavelengths λc of different specimens were measured.

Figure 7A:
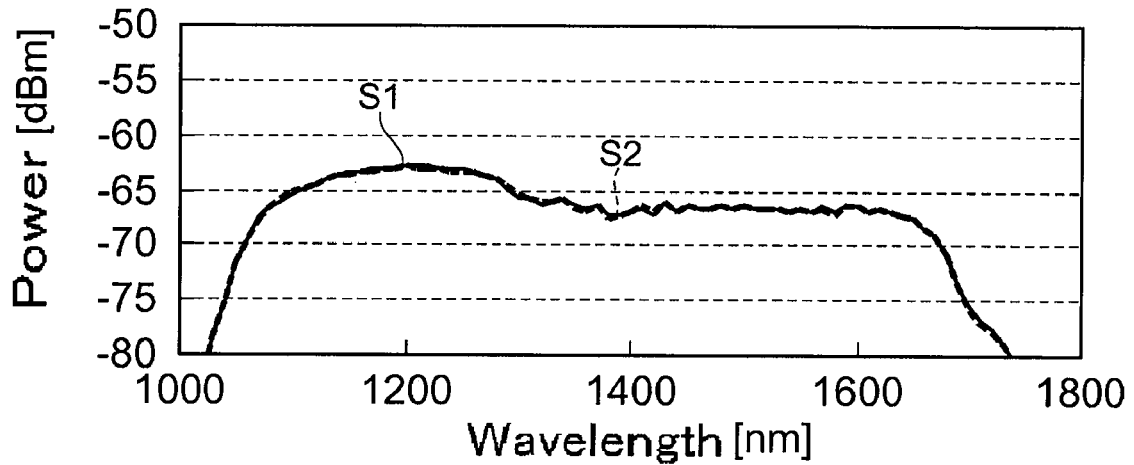
FIG. 7A is a graph showing a first power spectrum S1 and a second power spectrum S2 determined by the bend reference technique.
Figure 7B:
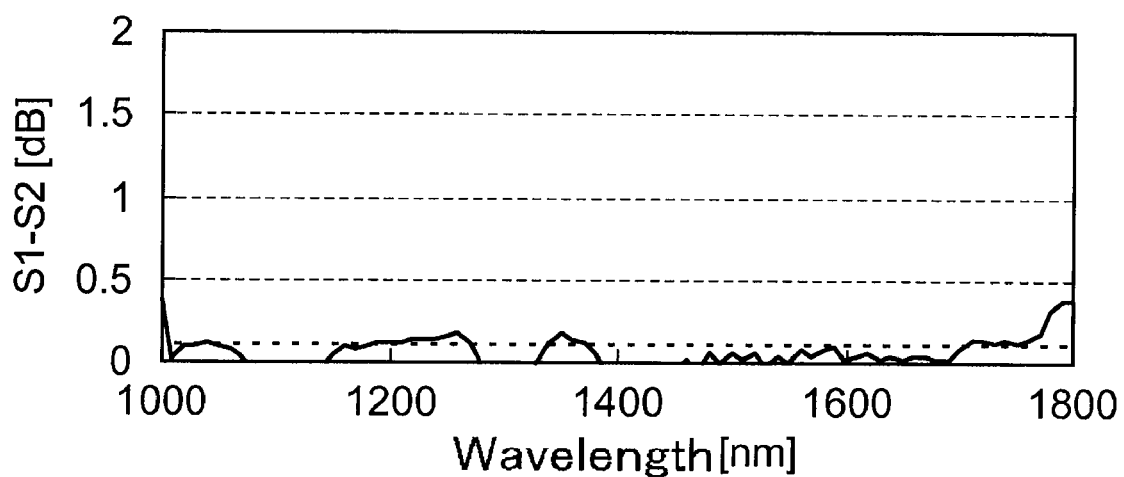
FIG. 7B is a graph showing the corresponding difference spectrum (S1−S2).

FIG. 7A is a graph showing a first power spectrum S1 and a second power spectrum S2 obtained by the bend reference technique using an optical fiber having low bending loss in higher-order modes as a specimen. FIG. 7B is a graph showing the corresponding difference spectrum (S1−S2). Since the difference between the first power spectrum S1 and the second power spectrum S2 is small, it was difficult to measure the cutoff wavelength λc of the specimen.

Figure 8A:
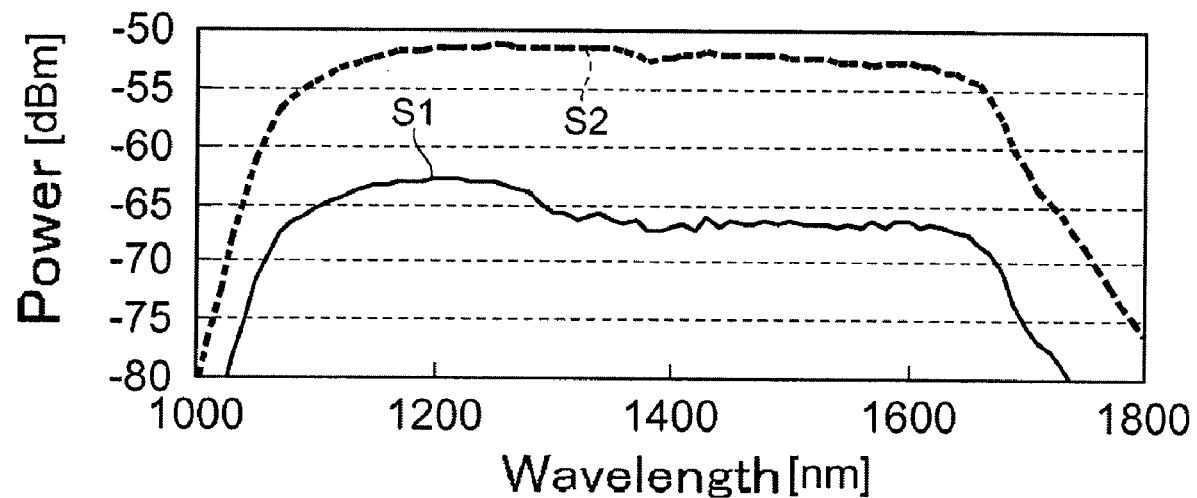
FIG. 8A is a graph showing a first power spectrum S1 and a second power spectrum S2 determined by the multimode reference technique.
Figure 8B:
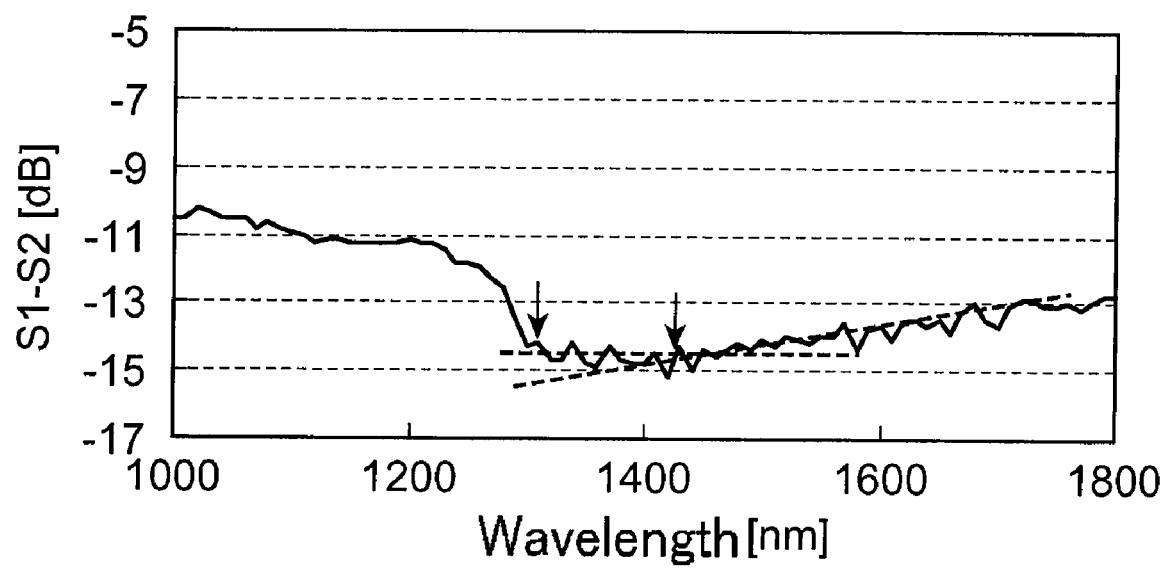
FIG. 8B is a graph showing the corresponding difference spectrum (S1−S2).

FIG. 8A is a graph showing a first power spectrum S1 and a second power spectrum S2 obtained by the multimode reference technique using an optical fibers having a plurality of higher-order mode cutoff wavelengths close to each other as specimens. FIG. 8B is a graph showing the corresponding difference spectrum (S1−S2). As shown in FIG. 8B, since there are a plurality of peaks close to each other (as indicated by arrows) in the difference spectrum (S1–S2), it was difficult to measure the cutoff wavelength λc of the specimens.

Figure 9A:
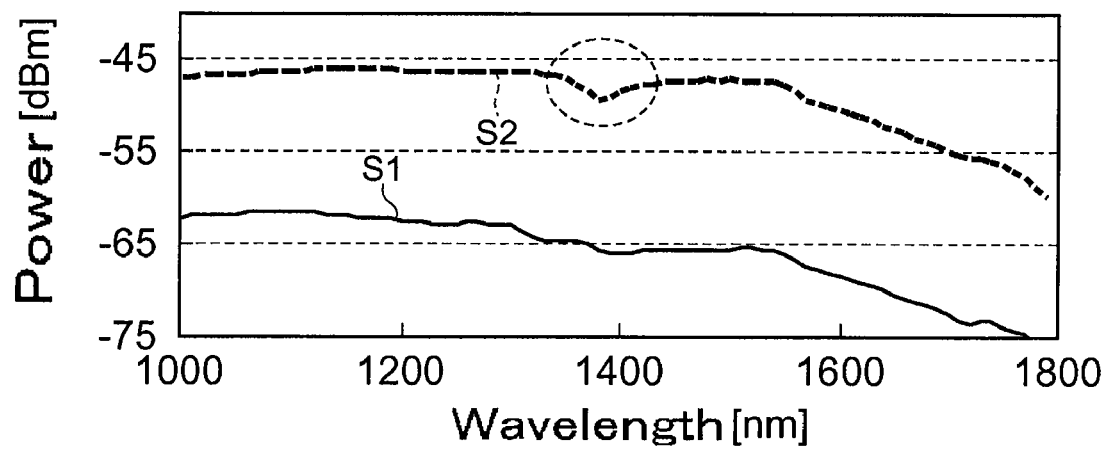
FIG. 9A is a graph showing a first power spectrum S1 and a second power spectrum S2 determined by the multimode reference technique.
Figure 9B:
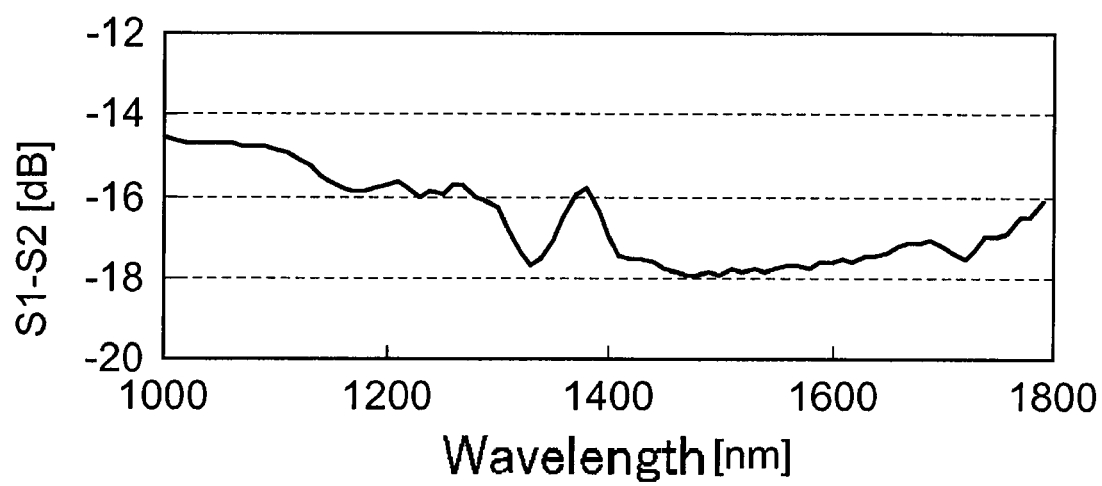
FIG. 9B is a graph showing the corresponding difference spectrum (S1−S2).

FIG. 9A is a graph showing a first power spectrum S1 and a second power spectrum S2 obtained by the multimode reference technique using an optical fiber having the cutoff wavelength λc close to an OH loss wavelength (i.e., a wavelength position enclosed with a dotted line) as a specimen. FIG. 9B is a graph showing the corresponding difference spectrum (S1–S2). Since the effect of OH loss of the multimode fibers 2 and 3 appears in the difference spectrum, it was difficult to measure the cutoff wavelength λc of the specimen.

Figure 10A:
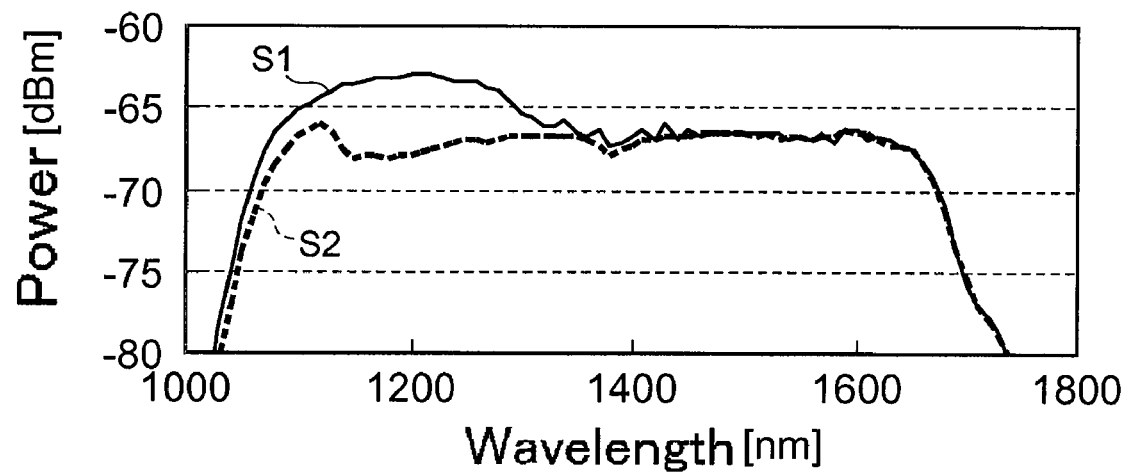
FIG. 10A is a graph showing a first power spectrum S1 and a second power spectrum S2 determined by the method according to the embodiment of the present invention.
Figure 10B:
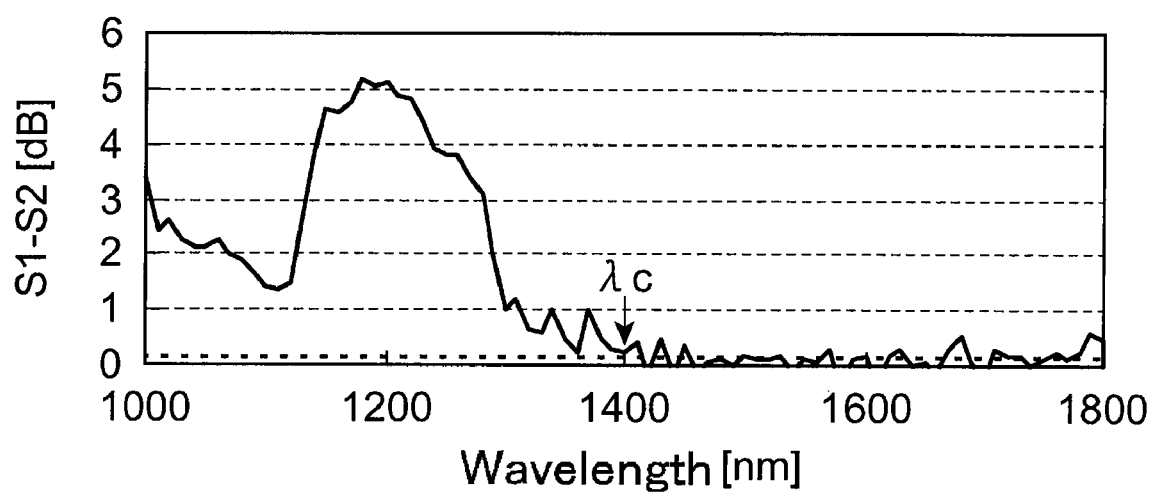
FIG. 10B is a graph showing the corresponding difference spectrum (S1−S2).

FIG. 10A is a graph showing a first power spectrum S1 and a second power spectrum S2 obtained by the method according to the embodiment of the present invention. FIG. 10B is a graph showing the corresponding difference spectrum (S1–S2). With the cutoff wavelength measuring method according to the embodiment of the present invention, it was possible to easily estimate the cutoff wavelength λc of any of the following specimens: an optical fiber having low bending loss in higher-order modes, an optical fibers having a plurality of higher-order mode cutoff wavelengths close to each other, and an optical fiber having a cutoff wavelength close to an OH loss wavelength of multimode fibers serving as an input fiber and an output fiber in cutoff wavelength measurement.

With the cutoff wavelength measuring method according to the embodiment of the present invention, it is possible to measure a higher-order mode cutoff wavelength of a specimen for which it is difficult to measure its cutoff wavelength with a known method. Therefore, when the cutoff wavelength measuring method according to the embodiment of the present invention is used to measure a higher-order mode cutoff wavelength of an optical fiber and signal light having a wavelength longer than the thus measured cutoff wavelength of the optical fiber is transmitted, it is possible to create a reliable optical communication system for single-mode transmission.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. A method for measuring a higher-order mode cutoff wavelength of an optical fiber, comprising:
    a first step of joining a multimode fiber to a first end of an optical fiber under test whose higher-order mode cutoff wavelength is to be measured, allowing light to propagate from the multimode fiber to the optical fiber under test, measuring an intensity of light exiting from a second end of the optical fiber under test after propagating through the optical fiber under test, and determining a first power spectrum on the basis of the measured intensity of light;
    a second step of joining the multimode fiber to a first end of a reference fiber having bending loss higher than that of the optical fiber under test in a predetermined wavelength range, allowing light to propagate from the multimode fiber to the reference fiber, measuring an intensity of light exiting from a second end of the reference fiber after propagating through the reference fiber, and determining a second power spectrum on the basis of the measured intensity of light;
    a third step of determining a difference spectrum by subtracting the second power spectrum from the first power spectrum; and
    a fourth step of determining a higher-order mode cutoff wavelength of the optical fiber under test on the basis of a shape of the difference spectrum.

2. The method according to claim 1, wherein the fourth step includes
    a first sub-step of determining a specific range where a difference from a minimum value of the difference spectrum is less than 0.1 dB and a derivative of the difference spectrum is substantially 0;
    a second sub-step of determining an average value of the difference spectrum in the specific range; and
    a third sub-step of drawing, in a graph showing the difference spectrum, a straight line representing a value that is 0.1 dB larger than the average value, determining a wavelength at an intersection point of the difference spectrum and the straight line, and determining the wavelength at the intersection point as the higher-order mode cutoff wavelength of the optical fiber under test when values of the difference spectrum on a shorter wavelength side where wavelengths are shorter than the wavelength at the intersection point are larger than values of the difference spectrum on a longer wavelength side where wavelengths are longer than the wavelength at the intersection point.

3. The method according to claim 1, wherein in the second step, a length, a bending diameter, or the number of turns of the reference fiber is set such that the first power spectrum is larger than the second power spectrum on a longer wavelength side where wavelengths are longer than a cutoff wavelength of the reference fiber.

4. The method according to claim 1, wherein in the predetermined wavelength range, a difference in mode field diameter between the optical fiber under test and the reference fiber is 0.5 μm or less.

5. The method according to claim 1, wherein in the first step, the first power spectrum of the optical fiber under test placed under a condition of actual system is determined.

6. An optical communication system comprising, as an optical transmission path, an optical fiber under test whose higher-order mode cutoff wavelength is measured using the method according to claim 5,
    wherein signal light having a wavelength longer than the measured cutoff wavelength is transmitted through the optical fiber under test.

* * * * *

UNITED STATES PATENT AND TRADEMARK OFFICE
CERTIFICATE OF CORRECTION

PATENT NO.       : 8,223,323 B2  
APPLICATION NO.  : 12/750029  
DATED            : July 17, 2012  
INVENTOR(S)      : Tetsuya Nakanishi Page 1 of 1

It is certified that error appears in the above-identified patent and that said Letters Patent is hereby corrected as shown below:

On the title page, please add Item (60):

Related U.S. Application Data

Provisional application No. 61/164,673 filed on March 30, 2009.

Signed and Sealed this
Eighteenth Day of December, 2012

David J. Kappos
*Director of the United States Patent and Trademark Office*